United States Patent [19]

Blidung et al.

[11] Patent Number: 5,630,309

[45] Date of Patent: May 20, 1997

[54] METHOD OF AND APPARATUS FOR SUPPLYING BLANKS TO PACKING MACHINES

[75] Inventors: Otto Blidung; Lothar Wohlgemuth, both of Geesthacht; Jens Deichmöller, Reinbek, all of Germany

[73] Assignee: Hauni Maschinenbau AG, Hamburg, Germany

[21] Appl. No.: 445,137

[22] Filed: May 19, 1995

[30] Foreign Application Priority Data

Jun. 3, 1994 [DE] Germany .................. 44 19 416.1

[51] Int. Cl.⁶ .................................................. B65B 35/30
[52] U.S. Cl. ...................... 53/443; 53/209; 53/558; 53/493; 53/147; 198/347.4
[58] Field of Search ........................ 53/55, 58, 500, 53/495, 207, 209, 493, 443, 64, 558, 147; 198/347.1, 347.4, 436, 571, 572, 447, 448

[56] References Cited

U.S. PATENT DOCUMENTS

| | | | |
|---|---|---|---|
| 3,122,231 | 2/1964 | Pence et al. ......................... | 198/347.4 |
| 3,181,713 | 5/1965 | Abbe et al. ......................... | 198/347.4 |
| 4,527,936 | 7/1985 | Hartlieb ............................. | 198/436 |
| 4,570,783 | 2/1986 | Newcom et al. . | |
| 4,621,725 | 11/1986 | Rutter ............................... | 198/436 |
| 4,635,784 | 1/1987 | Bourgeois ........................... | 198/347.4 |
| 4,907,941 | 3/1990 | Focke et al. . | |
| 5,004,396 | 4/1991 | Focke . | |
| 5,125,782 | 6/1992 | Goldschmidt ...................... | 198/347.1 |
| 5,183,380 | 2/1993 | Focke et al. . | |
| 5,267,821 | 12/1993 | Bodart .............................. | 412/11 |
| 5,411,131 | 5/1995 | Haegele ............................ | 198/347.4 |

FOREIGN PATENT DOCUMENTS

| | | |
|---|---|---|
| 0123547A2 | 10/1984 | European Pat. Off. . |
| 87688 | 12/1966 | France . |
| 3544096A1 | 3/1986 | Germany . |
| 3823032C2 | 11/1990 | Germany . |

*Primary Examiner*—John Sipos
*Assistant Examiner*—Gene L. Kim
*Attorney, Agent, or Firm*—Darby & Darby

[57] ABSTRACT

A packing machine receives stacks of blanks, which are to be converted into packets for cigarettes, from an apparatus wherein a first conveyor delivers stacks of blanks to a first station at a first frequency and a second conveyor advances stacks from a second station to the machine at a second frequency which can be less than the first frequency. The stations are connected to each other by two transporting units each of which can act as a first-in first-out reservoir for stacks or as a conveying unit which can move successive stacks without interruptions all the way from the first to the second station. The conveying unit is operative alone as long as the second frequency matches the first frequency, and the reservoir begins to accept surplus stacks when the first frequency exceeds the second frequency. Once filled, the reservoir begins to deliver stacks to the second station and continues to receive stacks from the first station until the reservoir is empty. The conveying unit begins to act as a reservoir when the reservoir is emptied, and the reservoir thereupon acts as a conveying unit until the other unit is filled with stacks.

24 Claims, 4 Drawing Sheets

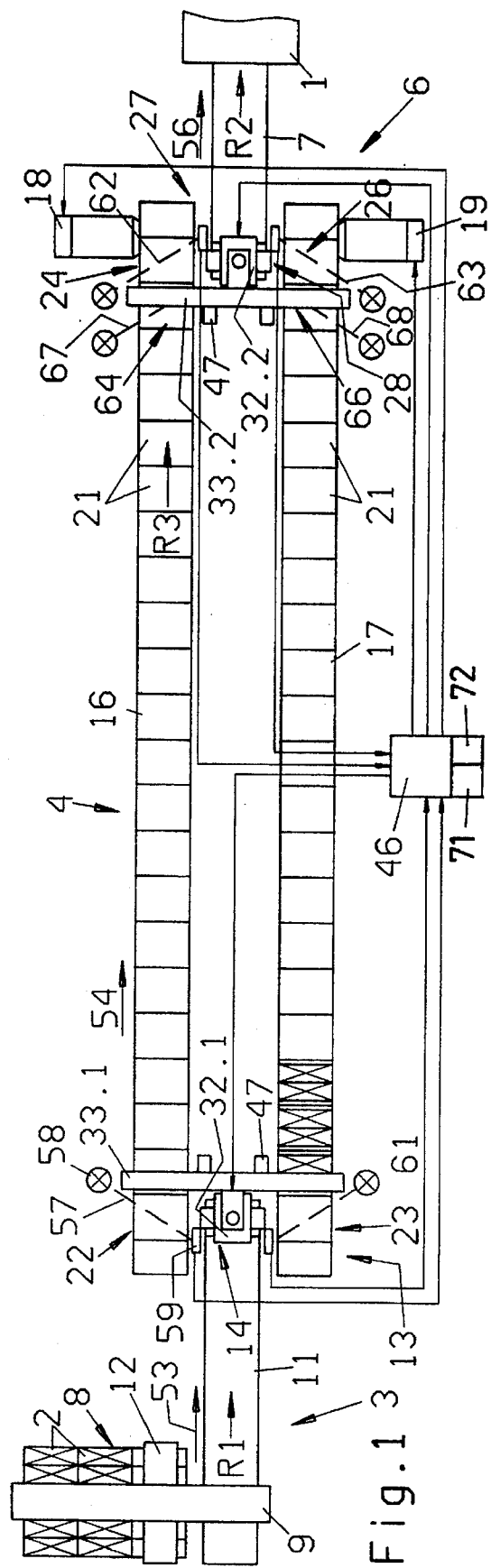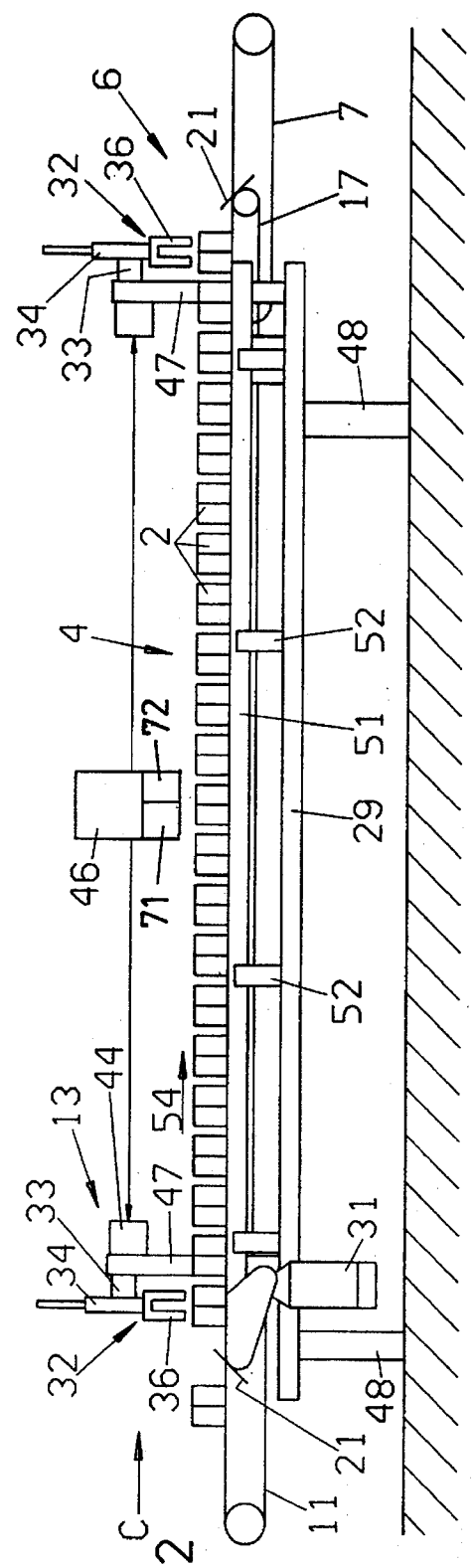

METHOD OF AND APPARATUS FOR SUPPLYING BLANKS TO PACKING MACHINES

BACKGROUND OF THE INVENTION

The invention relates to improvements in methods of and in apparatus for supplying discrete commodities to consuming or processing machines. More specifically, the invention relates to improvements in methods and apparatus which can be resorted to for the supplying of sets (e.g., stacks) of blanks to machines wherein groups (e.g., arrays of twenty) rod-shaped articles of the tobacco processing industry are introduced into and sealed in packets. Typical examples of packets which are presently in use for the confinement of arrays of rod-shaped articles of the tobacco processing industry (such as plain or filter cigarettes and hereinafter called cigarettes for short) are so-called hinged-lid packets or packs.

Heretofore known apparatus for supplying stacks of blanks to packing machines for conversion into packets which sealingly confine arrays of cigarettes often employ a first conveyor which delivers stacks of blanks from a source to a first station, a second conveyor which advances stacks from a second station to the packing machine, and a third conveyor which transports stacks from the first station to the second station. A drawback of heretofore known methods and apparatus is that they are not sufficiently reliable to ensure predictable feeding of stacks of blanks to modern high-speed cigarette packing machines. Predictable delivery of blanks is particularly important when the machines are designed to turn out large numbers of packets per unit of time. If the blanks are to be converted into hinged-lid packets, they are normally stored in a magazine of rather limited capacity because the space is at a premium in the halls of plants wherein cigarettes are confined in hinged-lid packets and/or other types of receptacles. Since the magazines are relatively small, they must be refilled either continuously or at frequent intervals. This necessitates the establishment of paths between the magazines of discrete packing machines and a main magazine or reservoir which is designed to contain a large supply of blanks.

U.S. Pat. No. 5,183,380 discloses an apparatus which is designed to supply stacks of blanks to a cigarette packing machine and employs means for transferring stacks of blanks from pallets to a magazine of the packing machine. The transferring means includes and endless horizontal conveyor which is provided with pockets for reception and temporary confinement of stacks of blanks between a pallet and the magazine of the respective packing machine. A further conveyor is provided to transfer stacks from a pallet into successive pockets of the endless horizontal conveyor. The stacks in the pockets form a row which extends from the further conveyor to the magazine when the operation of the patented apparatus is proper. The failure of the further conveyor to deliver a stack into each and every oncoming pocket of the endless horizontal conveyor is likely to entail, or invariably results in, an interruption of normal delivery of stacks from the magazine into the packing machine. This can result in lengthy interruptions of the operation of the packing machine or in a reduction of the speed of the packing machine with attendant huge losses in output.

To the extent that it can be considered as contributing to the understanding of the present invention, the disclosure of the U.S. Pat. No. 5,183,380 to Focke et al. is incorporated herein by reference.

OBJECTS OF THE INVENTION

An object of the invention is to provide a novel and improved method of supplying discrete commodities to consuming machines, particularly of supplying accumulations of blanks to packing machines for cigarettes or other rod-shaped articles of the tobacco processing industry.

Another object of the invention is to provide a method which is more reliable than heretofore known methods in that it is more likely to ensure predictable delivery of commodities to a consuming machine than heretofore known methods.

A further object of the invention is to provide a method which can be practiced to supply accumulations of blanks to existing cigarette packing and like machines.

An additional object of the invention is to provide a novel and improved method of temporarily storing supplies of commodities in positions of readiness for delivery to a consuming machine.

Still another object of the invention is to provide a novel and improved apparatus for the practice of the above outlined method.

A further object of the invention is to provide the apparatus with novel and improved means for manipulating commodities on their way from a source to the consuming machine.

Another object of the invention is to provide novel and improved magazines for temporary storage of commodities on their way from a source to the consuming or processing machine.

An additional object of the invention is to provide the apparatus with novel and improved means for controlling the operation of its mobile constituents.

Still another object of the invention is to provide an apparatus which can deliver commodities to consuming machines at an optimum rate or frequency irrespective of eventual fluctuations or interruptions of delivery of commodities from the source and/or of eventual fluctuations of the rate of processing of commodities by the consuming machines.

SUMMARY OF THE INVENTION

One feature of the present invention resides in the provision of a method of supplying discrete commodities to a consuming machine, e.g., to a machine which is operative to confine groups of rod-shaped articles of the tobacco processing industry in packets. The commodities can contain sets of blanks which the machine converts into packets, e.g., into so-called hinged-lid packets. The improved method comprises the steps delivering a series of successive commodities to a first station at a first frequency, advancing a series of successive commodities from a second station to the consuming machine at a second frequency which—at least at times—is less than the first frequency, transporting commodities from the first station to the second station along one of a plurality of elongated paths at a third frequency which at least closely approximates the second frequency so that the rate of transport of commodities along the one path is less than the rate of delivery of commodities to the first station (with the resulting establishment of a surplus of commodities when the first frequency exceeds the second and third frequencies), and introducing the commodities which constitute the surplus into another of the plurality of elongated paths.

The method further comprises the step of establishing a first-in first-out reservoir for commodities which are introduced into the other path and can also comprise the steps of transporting the commodities to the second station along the other path at the third frequency and introducing the commodities constituting the surplus into the one path in response to the development of predetermined circumstances pertaining to one or more of the following: (a) the delivery of commodities to the first station; (b) the advancement of commodities from the second station to the consuming machine; and (c) the transport of commodities from the first station to the second station.

The method can further comprise the steps of monitoring the second frequency, generating signals which denote the monitored second frequency, and utilizing the signals to control at least one of the transporting and introducing steps. The utilizing step can include transporting the commodities to the second station along the other path at the third frequency and introducing the commodities constituting the surplus into the one path when the other path is filled with commodities which constitute the surplus.

The method can further comprise the steps of temporarily interrupting the delivery of commodities to the first station with attendant automatic discontinuation of the transporting step, and transporting commodities from the other path to the second station at the second frequency in response to the interruption of delivery of commodities to the first station. Such method can further comprise the steps of restarting the delivery of commodities to the first station at an increasing frequency which ultimately rises above the second frequency, continuing the introduction of commodities from the first station into the other path until the increasing (first) frequency rises to the second frequency, and introducing into and storing in the one path that surplus of commodities which develops when the increasing (first) frequency exceeds the second frequency. Still further, such method can comprise the step of transporting the commodities to the second station along the other path at the third frequency until the one path is filled with commodities.

As already mentioned above, the method can comprise the step of establishing a first-in first-out reservoir for commodities which are introduced into the other path, and such method can further comprise the steps of monitoring the numbers of commodities in the one path and in the other path and generating first and second signals respectively denoting the monitored numbers in the one path and in the other path, and transporting the commodities along the other path to the second station at the third frequency when the monitored number of commodities in the other path reaches a predetermined value (e.g., a value denoting that the other path is filled with commodities). Such method can also comprise the steps of transporting the commodities from the first station to the second station along the other path as long as the second and third frequencies match the first frequency, and introducing the commodities constituting the surplus into the one path when the first frequency exceeds the second and third frequencies.

Another feature of the invention resides in the provision of an apparatus for supplying discrete commodities to a consuming machine (e.g., an apparatus for supplying accumulations of blanks to a machine which serves to pack groups of rod-shaped smokers' products into packets and which is designed to convert the blanks into such packets, e.g., hinged-lid packets). The improved apparatus comprises a first conveyor (e.g., an endless belt or chain conveyor, an elevator conveyor, a reciprocable pusher-type conveyor or the like) having means for delivering a series of successive commodities from a source (e.g., a source which receives large numbers of commodites from a succession of pallets) to a first station at a first frequency, a second conveyor (such second conveyor may but need not be similar to or identical with the first conveyor) having means for advancing successive commodities from a second station to the consuming machine at a second frequency which—at least a times—is less than the first frequency, a plurality of transporting units defining discrete elongated paths extending between the first and second stations (each such unit includes means for transporting commodities from the first station to the second station independently of each other unit), a first transfer device having means for transferring commodities from the first station into selected paths, and a second transfer device having means for transferring commodities from selected paths to the second station.

The means for transporting commodities can include endless flexible elements having at least substantially horizontal reaches for the transport of commodities between the first and second stations.

At least one of the transporting units can include a reversible prime mover (e.g., an electric stepping motor) for the respective transporting means.

The aforementioned paths can include at least substantially parallel first and second paths. Such first and second paths can be established in such a way that they have first ends disposed at the first station and flanking a discharge end of the first conveyor as well as second ends disposed at the second station and flanking a receiving or intake end of the second conveyor.

Each of the transferring means can be installed in such a way that it is movable at the respective station substantially transversely of the plurality of paths.

At least one of the transfer devices can include a vehicle which is movable at the respective station in first and second directions (particularly transversely of the plurality of paths) along a track (e.g., a track defined by a crosshead) extending at least substantially transversely of the paths. The vehicle can include tongs movable in third and fourth directions (e.g., up and down) other than the first and second directions toward and from engagement with commodities at the respective station.

The apparatus preferably further comprises means for controlling the operation of the first transfer device so as to effect the transfer of commodities into selected paths in dependency upon the development of predetermined circumstances including at least one of the following: (a) the delivery of commodities to the first station; (b) the transport of commodities between the first and second stations; and (c) the advancement of commodities from the second station to the consuming or processing machine.

Each path has first and second ends at the respective (first and second) stations, and at least one of the transporting means can include means for at least substantially uninterruptedly moving successive commodities of the series from the first end to the second end of the respective path. Another of the transporting means can include means for moving commodities stepwise from the first toward the second end of the respective path. Each transporting means of such apparatus can further include means for moving commodities substantially uninterruptedly as well as stepwise. Such apparatus can further comprise means for operating one of the transporting means stepwise when another of the transporting means completes the filling of the respective path with commodities (e.g., substantially end-to-end, i.e., all the way between as well as at the first and second ends of the respective path).

At least one of the transporting means can be operated to constitute a magazine or reservoir for relatively large supplies of commodities, particularly a first-in first out reservoir which ensures that none of the commodities must remain in the reservoir for a relatively long interval of time.

The first conveyor can receive a series of successive commodities from successive pallets by way of a suitable automaton.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a schematic plan view of an apparatus which embodies one form of the invention;

FIG. 2 is a schematic side elevational view of the apparatus which is shown in FIG. 1;

DESCRIPTION OF PREFERRED EMBODIMENTS

Figure 3:
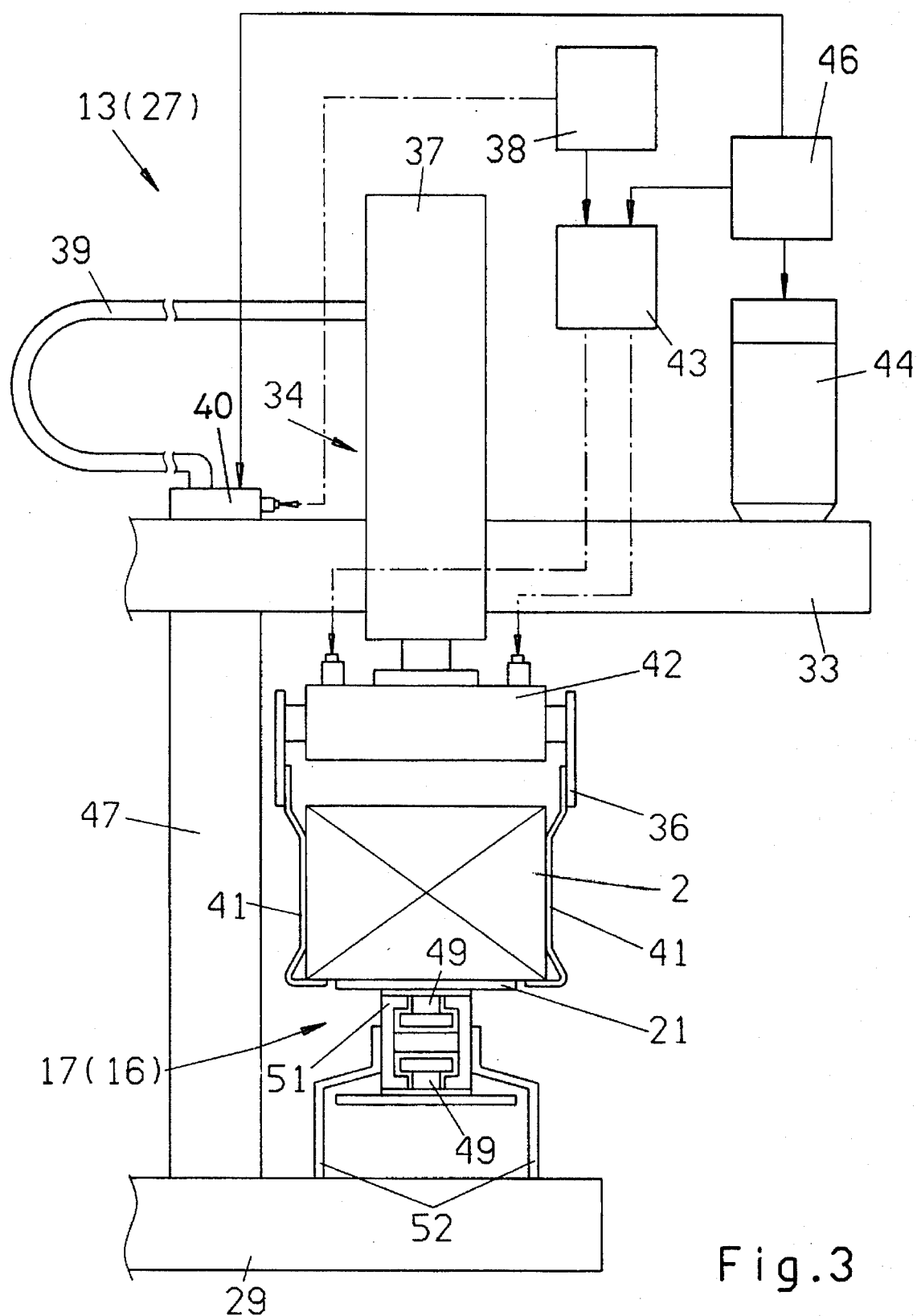
FIG. 3 is an enlarged front elevational view of a detail as seen in the direction of arrow C in FIG. 2.

The apparatus which is shown in FIGS. 1 and 2 is designed to supply discrete stacks or bales 2 of blanks for the making of cigarette packets to a packing machine 1. The stacks or bales 2 (hereinafter called stacks) are delivered from a source (such as a reciprocable feeder 12 cooperating with a gantry 9) to a first station 3 by a first conveyor 11, and a second conveyor 7 is provided to advance stacks 2 from a second station 6 into the packing machine 1. The stations 3 and 6 are spaced apart from each other, and the apparatus further comprises a transporting system 4 including a plurality of transporting units (two shown at 16 and 17) which serve to transport series of successive stacks 2 from the station 3 to the station 6 along discrete straight elongated paths. Such paths are preferably parallel to each other (see FIG. 1) and have first ends or receiving ends 22, 23 at the station 3 as well as second ends or discharge ends 24, 26 at the station 6.

The conveyor 11 is an endless belt or chain conveyor and has a receiving end at the gantry 9 and a discharge end 14 in the space between the first ends 22, 23 of the elongated paths defined by the transporting units 16 and 17. The source is designed to receive relatively large groups 8 of stacks 2 from successive pallets (not specifically shown), and such source is further designed to singularize the stacks of successive groups 8 so that the upper reach of the conveyor 11 delivers to the station 3 a series of discrete stacks 2 at a first frequency R1. The gantry 9 and the feeder 12 can constitute a robot wherein the feeder constitutes a transporter or carriage movable transversely of the conveyor 11 so that it can pick up stacks 2 from the freshly delivered group 8 and deliver successive stacks onto the upper reach of the conveyor 11. It is equally possible to design the components 9 and 12 of the improved apparatus in such a way that the conveyor 11 can receive a series of successive groups of two or more stacks 2. It is presently preferred to construct the apparatus in such a way that the discharge end 14 of the conveyor 11 can deliver to the station 3 a single series of discrete stacks 2.

The conveyor 11 constitutes but one form of means for delivering stacks 2 from the source to the station 3, and more specifically to that part (13) of the station 3 which receives the discharge end 14 of the conveyor 11. For example, it is equally possible to have the robot 9, 12 deliver a series of successive stacks 2 onto a smooth horizontal surface and to replace the endless flexible element of conveyor 11 with a pusher which is reciprocable in directions in and counter to that indicated by the arrow 53 so that it can push successive stacks 2 to the location of the part 13 of the station 3 and that successive stacks 2 can be transferred into the end 22 of the path defined by the transporting unit 16 or into the end 23 of the path defined by the transporting unit 17. Furthermore, the conveyor 11 can be replaced by a vertical or upwardly sloping elevator conveyor having a set of equidistant pockets or other receptacles for discrete stacks 2. The illustrated conveyor 11 having an endless belt or chain or another suitable endless flexible element is driven by a motor 31 (FIG. 2).

The stack transporting means of the units 16, 17 include endless belts, endless chains or other suitable endless flexible elements having preferably horizontal upper reaches which serve to move the stacks 2 along the respective elongated paths. The illustrated endless flexible elements of the units 16, 17 include plates or leaves 21 which overlie or are closely adjacent to each other during movement along the respective paths to establish smooth or at least substantially smooth supporting surfaces for the series of stacks 2 which are being transported by the unit 16 and/or 17 from the station 3 toward the station 6.

The receiving end 28 of the conveyor 7 is disposed in that part 27 of the station 6 which is flanked by the ends 24, 26 of the two elongated paths defined by the transporting units 16 and 17. The first ends 22, 23 of the two elongated paths may but need not be at the exact level of the respective second ends 24, 26.

The transporting units 16, 17 are mounted on an elongated supporting frame 29 which, in turn, is mounted on longitudinally spaced apart upright legs or columns 48 (see FIG. 2).

The apparatus of FIGS. 1 and 2 further comprises a first transfer device 32.1 which is installed at the part 13 of the first station 3 and can be operated to transfer stacks 2 from the discharge end 14 of the first conveyor 11 onto the adjacent receiving end of the transporting unit 16 or 17, i.e., into the end 22 of the path defined by the unit 16 or into the end 23 of the path defined by the unit 17. An analogous second transfer device 32.2 is located at the part 27 of the station 6 and can be operated to transfer, onto the receiving end 28 of the second conveyor 7, stacks 2 from the adjacent end 24 of the path defined by the transporting unit 16 or from the adjacent end 26 of the path defined by the transporting unit 17.

All necessary details of one of the transfer devices 32.1 and 32.2 are shown in FIGS. 1 to 3, particularly in FIG. 3, and the other of these devices is or can be identical with the one device. Therefore, FIGS. 2 and 3 employ characters without pointing out whether the respective parts belong to the transfer device 32.1 at the station 3 or to the transfer device 32.2 at the station 6. Each transfer device 32 comprises a crosshead 33 (note the crossheads 33.1 and 33.2 in FIG. 1) which, in turn, is mounted on upright columns 47 (one shown in FIG. 3) carried by the frame 29. FIG. 3 shows one of the transfer devices 32 in one of its end positions, namely at a level above the end 22 of the path defined by the transporting unit 16 or above the end 23 of the path defined by the transporting unit 17.

The stack transferring means of each device 32 comprises a vehicle or carriage 34 (hereinafter called vehicle) which is reciprocable along the respective crosshead 33 and is movable up and down (as viewed in FIG. 2 or 3) by a fluid-operated motor 37 so that it can cause its tongs 36 to descend toward or to rise above the discharge end 14 of the conveyor 11 as well as to descend toward or to rise above the adjacent end portion of the transporting unit 16 or 17 (reference being had to the device 32.1) or that it can cause its tongs 36 to descend toward or to rise above the receiving end 28 of the conveyor 7 as well as to descend toward or to rise above the adjacent end portion of the unit 16 or 17 (reference being had to the device 32.2).

Each of the motors 37 can constitute an upright hydraulic or pneumatic cylinder and piston unit having a cylinder movable along the respective crosshead 33 and a downwardly extending piston rod supporting a second motor 42 (e.g., a horizontal hydraulic or pneumatic cylinder and piston unit) which serves to open or close the tongs 36. The tongs 36 have jaws or grippers 41 which engage opposite vertical sides of a stack 2 which is to be transported from the conveyor 11 onto the unit 16 or 17, or from the unit 16 or 17 onto the conveyor 7. The jaws 41 are movable toward and away from each other in (horizontal) directions at least substantially at right angles to the directions of (upward or downward) movement of the motors 42 (and hence the tongs 36) toward or away from the conveyor 11 or 7, toward or away from the end 22 or 23 of the path defined by the unit 16 or 17, or toward or away from the end 24 or 26 of the path defined by the unit 16 or 17.

Each of the transfer devices 32 further comprises a source 38 of pressurized hydraulic or pneumatic fluid and conduits 39 (shown in part by double solid lines and in part by phantom lines) which can convey fluid from the source 38 to the cylinders of the motors 37, 42 and from such motors back to the source 38 or to another destination. The means for regulating the flow of fluid to and from the motor 37 and/or 42 of the respective transfer device 32 includes adjustable valve means 43 receiving signals from a control circuit 46. The latter further controls a reversible electric or other suitable motor 44 which serves to move the vehicle 34 along the respective crosshead 33. The conduits 39 can be rigid if the source 38 shares all movements of the motors 37, 42 along the respective crosshead 33, and at least certain portions of such conduits will be flexible, telescoped into each other or otherwise movable with reference to one another if the source 38 does not share all movements of the motor 37 and/or 42 along the corresponding crosshead.

It is also possible to employ the valve or valves 43 only as a means for directly controlling the operation of the respective motor 42 and to provide a discrete valve or system of valves 40 to directly control the operation of the motor 37. The valves 40 and 43 receive signals directly from the corresponding outputs of the control circuit 46, the same as the motor 44.

The motor 44 can move the vehicle 34 back and forth along the respective crosshead 33 by way of a suitable rack-and-pinion drive (not shown) or by employing any other reliable motion transmitting means, e.g., an endless belt or chain conveyor.

The columns 47 are mounted on a horizontal top wall of the frame 29 between the transporting units 16, 17. The height of the aforementioned legs or columns 48 for the frame 29 can be selected in such a way that an adult person can stand upright beneath the top panel of the frame, i.e., beneath the support for the columns 47 which carry the crossheads 33 of the transfer devices 32.

FIG. 3 shows the vehicle 34 of the transfer device 32 at the portion 13 of the station 3, and more specifically above the end 23 of the path which is defined by the transporting unit 17. The tongs 36 of the vehicle 34 are about to deposit a stack 2 on the immediately adjacent plate or leaf 21 forming part of the upper reach of the endless flexible element of the unit 17. The plates or leaves 21 are carried by links 49 which are slidable in a groove of a profiled rail 51 extending along the path defined by the unit 17, i.e., between the ends 23 and 26 of such path. The rail 51 is mounted on the aforementioned top wall of the frame 29 at a level above supports 52 for the lower reach or return reach of the endless flexible element of the unit 17.

When the endless flexible element of the transporting unit 17 is driven by the respective (for example, reversible) prime mover 19, the links 49 slide in the groove of the rail 51 or are guided by the supports 52. This ensures accurate and predictable transport of stacks 2 from the end 23 to the end 26 of the path which is defined by the unit 17. The prime mover for the endless flexible element of the transporting unit 16 is or can be identical with the prime mover 19 and is shown in the upper right-hand portion of FIG. 1, as at 18.

As mentioned above, the transfer device 32.2 at the station 6 is or can be identical with the transfer device the details of which are shown in FIG. 3. The only difference is that the device 32.1 serves to transfer stacks 2 from the conveyor 11 onto the transporting unit 16 or 17, whereas the device 32.2 serves to transfer stacks 2 from the unit 16 or 17 onto the conveyor 7.

The arrow 53 indicates the direction of advancement of stacks 2 with the upper reach of the conveyor 11, the arrow 54 indicates the direction of advancement of stacks 2 with the upper reaches of the endless flexible elements forming part of the transporting units 16, 17, and the arrow 56 indicates the direction of advancement of stacks 2 with the upper reach of the conveyor 7, i.e., into the packing machine 1. As mentioned above, the prime movers 18, 19 for the endless flexible elements of the transporting units 16, 17 can constitute reversible electric or other suitable motors. In other words, the upper reach of the endless flexible element of the unit 16 or 17 can be caused to advance in the direction of the arrow 54 or in the opposite direction. Such mode of operating the unit 16 and/or 17 has been found to be desirable and advantageous under certain circumstances of use of the improved apparatus.

The control circuit 46 includes or is combined with numerous detectors or sensors which are designed and installed to monitor certain parameters when the apparatus is in actual use. Numerous detectors or sensors (hereinafter called sensors for short) are installed at the paths which are defined by the transporting units 16, 17 and include those shown at 57, 61 adjacent those ends (22, 23) of the two paths which are located at the station 3, and those shown at 62, 63 adjacent those ends (24, 26) of the two paths which are adjacent the station 6. The sensors 57, 61, 62 and 63 are designed to ascertain the presence or absence of stacks 2 at the adjacent ends of the two paths and to transmit appropriate signals to the control circuit 46.

The improved apparatus can employ mechanical and/or pneumatic sensors, proximity detectors, optoelectronic sensors and/or others. FIG. 1 shows that the sensor 57 includes a radiation source 58 at one side of the end 22 of the path defined by the unit 16, and an optoelectronic transducer 59 at the other side of the end 22. The end 22 of the path defined by the unit 16 is occupied when a stack 2 on the adjacent plate or leaf 21 of the endless flexible element of the unit 16 interrupts the beam of radiation from the source 58 to the transducer 59. The sensors 61, 62 and 63 are or can be identical with the sensor 57.

Two additional or auxiliary sensors 67, 68 are adjacent those portions (64 and 66, see particularly FIG. 4) of the paths respectively defined by the transporting units 16 and 17 which are immediately adjacent and are located upstream of the corresponding ends 24 and 26. The additional sensors 67, 68 constitute optional but desirable and advantageous constituents of the control circuit 46 and each thereof can be identical with the aforedescribed sensor 57. The circuit 46 further serves to transmit signals to the prime movers 18 and 19 for the endless flexible elements of the respective transporting units 16 and 17.

The control circuit 46 can further receive signals denoting the condition of the prime mover 31 for the endless flexible element of the first conveyor 11, the condition of the prime mover (not specifically shown) for the endless flexible element of the second conveyor 7, the position of the mobile part 12 of the robot including the gantry 9, the condition of the packing machine 1 and/or other variable parameters which are or which might be important for proper operation of the improved apparatus.

FIGS. 1 and 2 show that the control circuit 46 further comprises a first counter 71 for the overall number of stacks 2 in the first path which is defined by the transporting unit 16, and a second counter 72 which stores information pertaining to the overall number of stacks 2 in the second path which is defined by the transporting unit 17. The counter 71 receives signals from the sensors 57 and 62 respectively denoting the presence or lack of presence of stacks 2 at the ends 22 and 24 of the first path, and the counter 72 receives signals from the sensors 61 and 63 respectively denoting the presence or absence of stacks 2 at the ends 23 and 26 of the second path.

When the sensor 57 detects the transfer of a stack 2 into the first path, it advances the counter 71 by a digit. On the other hand, the number indicated by the counter 71 is reduced by a digit when the sensor 62 transmts a signal denoting the transfer of a stack 2 from the end 24 of the first path onto the receiving end 28 of the second conveyor 7. In other words, the information which is stored by the counter 71 is indicative of the difference between the numbers of stacks 2 delivered to and removed from the transporting unit 16. Analogously, the information furnished by the counter 72 is indicative of the overall number of stacks 2 on the unit 17. Such information is or can be used by the control circuit 46.

When the apparatus is in use, the robot 9, 12 transfers stacks 2 from successive groups 8 onto the conveyor 11 which, in turn, delivers successive stacks 2 into the range of the transfer device 32.1 at the part 13 of the first station 3 at a frequency R1 (i.e., the device 32.1 is called upon to transfer a given number of stacks 2 per unit of time). At the same time, the transfer device 32.2 at the second station 6 supplies to the receiving end 28 of the conveyor 7 a series of successive stacks 2 at a frequency R2, i.e., the packing machine 1 receives a certain number of stacks 2 per unit of time.

When considered over a relatively long period of time, the number of stacks 2 delivered to the transfer device 32.1 at the frequency R1 matches the number of stacks 2 which are supplied to the packing machine 1 because each and every stack 2 received from the first conveyor 11 is ultimately used up (i.e., its blanks are converted into packets for arrays of cigarettes) in the packing machine. However, the frequency R2 is likely to depart at times from (i.e., it will be less than or it will exceed) the frequency R1.

If the conveyor 11 were designed to deliver stacks 2 directly to the packing machine 1, this would mean that the frequency R2 would always match the frequency R1. Otherwise stated, the conveyor 11 would have to be driven at a lesser speed in response to each reduction of the packing machine speed below the nominal speed. Analogously, the speed of the conveyor 11 would have to be increased in response to each change of the packing machine speed from a speed less than the nominal speed toward a speed closer to the nominal speed. Such mode of operation would entail losses in output of the packing machine 1 during each of those stages when the frequency R1 would be less than the frequency R2 because this would necessitate a reduction of the speed of the packing machine to reduce the frequency R2 to a value matching that of the (less than standard) frequency R1. Such undesirable dependency of the output of the packing machine 1 upon the rate of delivery of stacks 2 to the conveyor 11 is avoided in accordance with the method and by resorting to the apparatus of the present invention.

Figure 4:
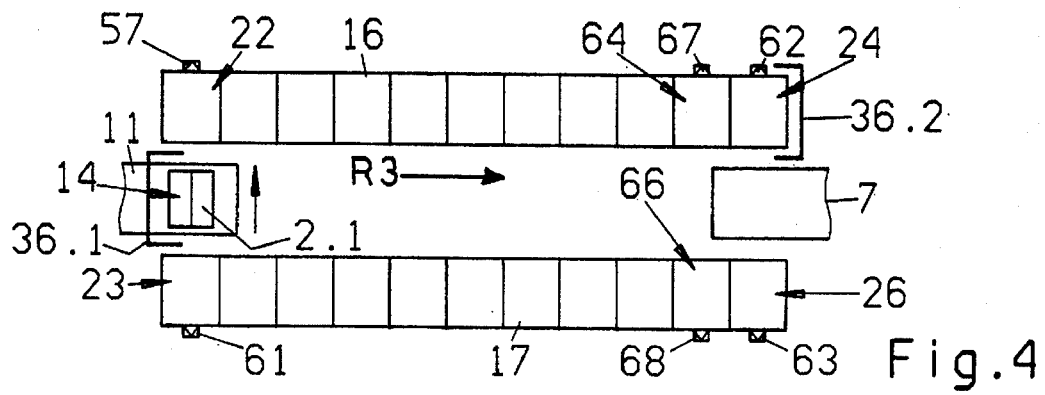
FIGS. 4 through 11 are schematic plan views of the two stations and of the transporting units during different stages of transport and storage of commodities between the two stations.

FIGS. 4 through 11 illustrate various stages of transport of stacks 2 along the paths defined by the units 16 and 17 under a number of different operating conditions. The transporting units 16, 17 are shown in a plan view, the same as in FIG. 1, and FIG. 4 shows that stage when the two paths are empty. Such situation can exist at the start of a shift, i.e., when the packing machine 1 is yet to be started and the prime mover 31 for the first conveyor 11 is idle.

Figure 5:
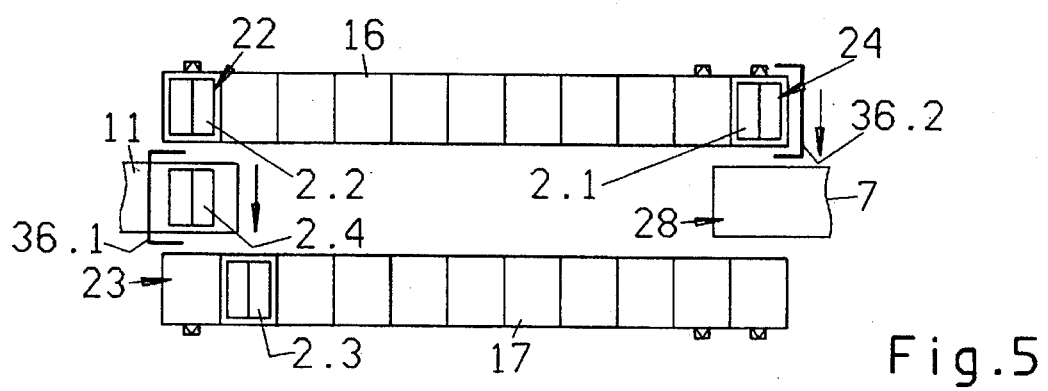

Let it be assumed that, when the packing machine 1 is thereupon started, the speed of the conveyor 7 is indicative of a frequency R2 which is less than the frequency R1 (the latter is determined by the selected speed of the prime mover 31 for the first conveyor 11). A stack 2 which arrives at the discharge end 14 of the conveyor 11 is picked up by the tongs 36.1 of the transfer device 32.1 at the station 3 and is transferred onto the adjacent plate or leaf 21 of the transporting unit 16 or 17. FIG. 4 shows the foremost stack 2.1 of a fresh series of successive stacks on the discharge end 14 of the conveyor 11, i.e., between the ends 22, 23 of the two elongated paths defined by the transporting units 16 and 17. As can be seen in FIG. 5, the device 32.1 has transferred the stack 2.1 onto the conveyor 16 and the latter's endless flexible element was driven by the respective prime mover 18 so that the stack 2.1 was moved, preferably without any interruptions, from the end 22 to the end 24 of the respective path.

Since the frequency R1 exceeds the frequency R2, the next or second stack 2.2 of the fresh series arrives into the part 13 of the first station 3 before the stack 2.1 is removed from the unit 16 by the tongs 36.2 of the transfer device 32.2. This can be seen in FIG. 5. The sensor 62 transmits to the control circuit 46 a signal denoting that the second end 24 of the path defined by the unit 16 is still occupied. At the same time, the sensor 57 transmits to the circuit 46 a signal denoting that the first end 22 of the path defined by the unit 16 (hereinafter called first path) is not occupied. The circuit 46 then transmits a signal (or a series of signals) causing the device 32.1 to transfer the stack 2.2 into the first portion 22 of the first path. In other words, the tongs 36.1 of the device 32.1 pick up the stack 2.2 at the discharge end 14 of the conveyor 11 and deposit the thus lifted stack 2.2 on the adjacent plate 21 of the endless flexible element forming part of the transporting unit 16.

The third stack 2.3 cannot be transferred from the discharge end 14 onto the first unit 16 because the first end of the first path is still occupied by the stack 2.2; therefore, the control circuit 46 causes the device 32.1 to transfer the stack 2.3 onto the first end 23 of the path (hereinafter called second path) which is defined by the transporting unit 17. The latter then performs the function of a first-in first-out reservoir and the circuit 46 causes the prime mover 19 to advance the endless flexible element of the unit 17 by a step (this is shown in FIG. 5) so that the first end 23 of the second path is free to receive the next-following stack 2.4.

The stepwise operation of the prime mover 19 is or can be such that the second path can receive a series of closely or immediately adjacent stacks (see FIGS. 6 to 11). This is desirable and advantageous because the transporting unit 16 or 17, whichever serves as a first-in first-out reservoir, can temporarily store a large number of stacks.

Figure 6:
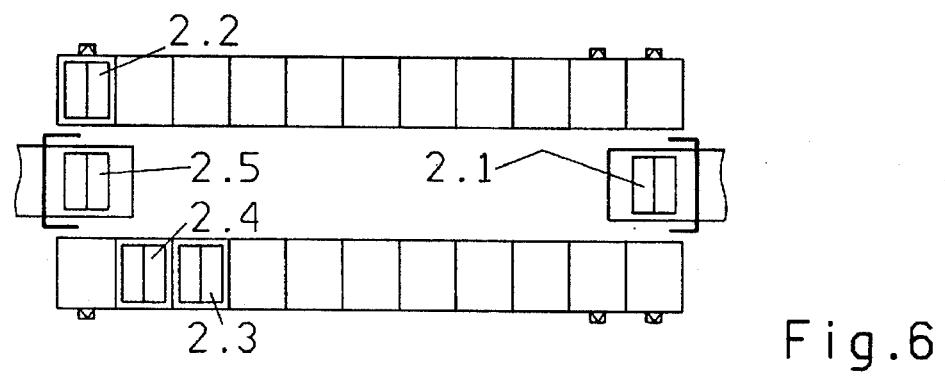

As the advancement of the stack 2.3 along the second path by a step is completed, the first end 23 of the second path is again unoccupied and is ready to receive the next-following stack 2.4 (FIG. 6). Again, the prime mover 19 advances the stacks 2.3 and 2.4 by a step (this, too, can be seen in FIG. 6) so that the first end 23 of the second path is again ready for reception of a stack.

In the meantime, the packing machine 1 is ready to receive a stack for conversion of its blanks into a series of packets which are draped around and confine arrays of five, ten, twenty or other numbers of cigarettes in a manner not forming part of the present invention. The control circuit 46 then transmits a signal to the transfer device 32.2 which transfers the stack 2.1 from the second end 24 of the first path onto the receiving end 28 of the conveyor 7 and the latter advances the stack 2.1 into the packing machine. The sensor 62 generates a signal which denotes that the second end 24 of the first path is unoccupied and the circuit 46 causes the prime mover 18 to advance the stack 2.2 all the way from the first end 22 to the second end 24 of the first path.

When the stack 2.2 reaches the second end 24 of the second path, the sensor 57 transmits a signal denoting that the first end 22 of the first path is unoccupied. The control circuit 46 is thus informed that the next stack 2.5 can be transferred from the conveyor 11 into the first end 22 of the first path.

During the aforedescribed stage of operation of the improved apparatus, the unit 16 transports to the conveyor 7 a series of stacks (namely those numbered 2.1, 2.2 and 2.5) at a frequency R3 which matches the frequency R2, i.e., the transporting unit 16 satisfies the requirements of the packing machine and those stacks (including the stacks 2.3 and 2.4) which constitute the surplus are put into temporary storage in the second path (i.e., on the upper reach of the endless flexible element forming part of the transporting unit 17). The surplus develops as long as or whenever the frequency R1 exceeds the frequency R2 (which latter matches the frequency R3).

Figure 7:
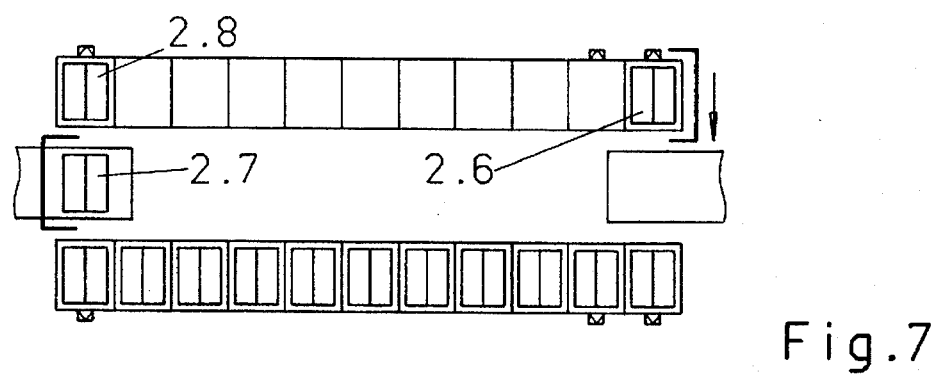

FIG. 7 shows the conditions which prevail when the first-in first-out reservoir (i.e., the transporting unit 17) is filled with a complete row of stacks 2 extending all the way from the first end 23 to the second end 26 of the second path. At the same time, the first and second ends 22, 24 of the first path accommodate the stacks 2.6, 2.8 and the stack 2.7 is supported by the discharge end 14 of the conveyor 11. If the apparatus were to continue its operation in a manner as described above with reference to FIGS. 2 to 6, the control circuit 46 would be compelled to reduce the speed of the conveyor 11 so that the frequency R1 would be reduced to the frequency R2 (i.e., to the frequency R3 of transport of stacks along the first path). In other words, it would be necessary to slow down the operation of the first conveyor 11 because the reservoir (unit 17) is filled to capacity and it is assumed that the frequency R1 continues to exceed the frequency R2 (i.e., the frequency R3).

Figure 8:
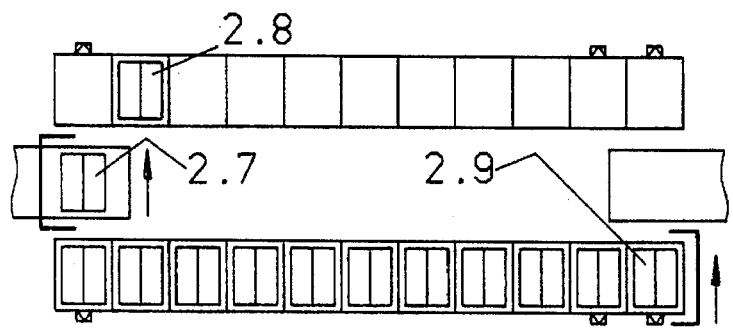

In accordance with the method of the invention, a reduction of the speed of the conveyor 11 is avoided by the simple expedient of reversing the functions of the transporting units 16 and 17, i.e., the unit 17 begins to supply successive stacks (starting with the stacks 2.3 and 2.4) to the conveyor 7 (by way of the transfer device 32.2) and the unit 16 becomes a first-in first-out reservoir which stores the surplus of stacks (beginning with the stack 2.8 and following with the stack 2.7) as soon as the transfer of the stack 2.6 from the second end 24 of the first path onto the conveyor 7 is completed (see FIGS. 7 and 8). Thus, the unit 16 begins to act as a reservoir as soon as the second path is filled to capacity and the second end 24 of the first path is unoccupied. The circuit 46 then causes the prime mover 18 to advance the endless flexible element of the unit 16 in stepwise fashion (compare FIGS. 7 and 8) so that the first end 22 of the first path is ready to receive the stack 2.7 (this stack is assumed to form part of the surplus which develops because the frequency R1 continues to exceed (at least at times) the frequency R2).

Figure 9:
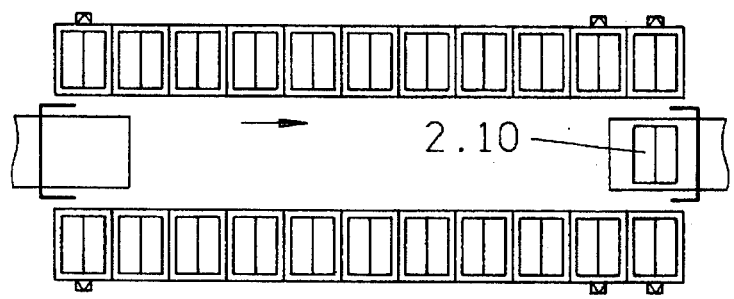

The device 32.2 then proceeds to transfer successive stacks (starting with the stack 2.9 shown in FIG. 8 and being actually the stack 2.3) from the second end 26 of the second path while the prime mover 19 continues to drive the endless flexible element of the unit 17 in stepwise fashion at such a speed that the frequency R3 at which the unit 17 advances stacks toward the transfer device 32.2 matches the frequency R2. Such mode of operation continues without any changes until the reservoir (unit 16) is filled with a full row of stacks (FIG. 9). The functions of the units 16, 17 are thereupon reversed in a manner analogous to that described above.

The capacity of the transporting units 16 and 17 is or can be selected in such a way that each of these units can temporarily accommodate the stacks 2 of at least one entire group 8. In other words, the frequency R2 of delivery of stacks from the second station 6 into the packing machine 1 need not be reduced (either to zero or to less than nominal frequency R2) between two successive deliveries of a pallet (with a group B) to the feeder 12.

Figure 10:
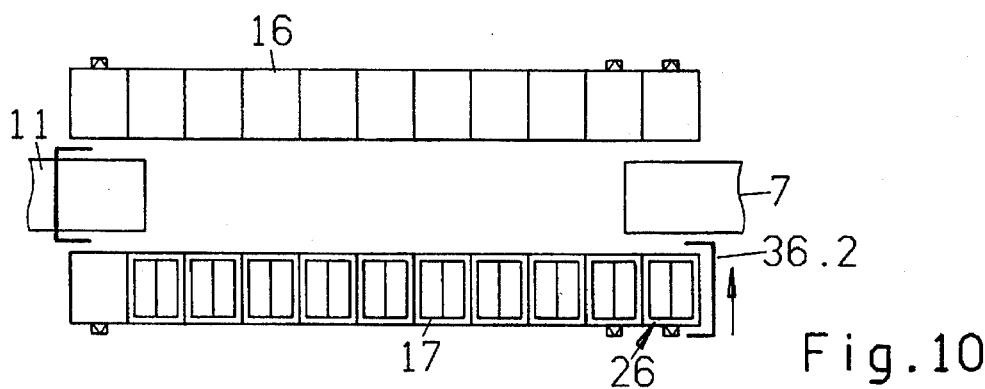

When the two paths are completely or nearly completely occupied prior to an oncoming exchange of pallets, the next exchange of pallets results in an interruption of the delivery of stacks 2 by the conveyor 11. The transfer device 32.2 is then caused to remove the foremost stack (2.10) from the second end (24 or 26) of one of the two paths, e.g., from the second path which is defined by the transporting unit 17. At such time, the unit 17 was performing the function of a first-in first-out reservoir (see FIG. 9). The second end 26 of the second path is then unoccupied and, therefore, the prime mover 19 advances the endless flexible element of the unit 17 by a step to thus leave the first end 23 of the second path unoccupied (FIG. 10). At such time, the first path is still completely occupied by a row of stacks extending all the way between and also occupying the ends 22 and 24 of the first path. The functions of the units 16 and 17 are thereupon interchanged, i.e., the unit 16 begins to function as a means for transporting successive stacks of the row of stacks in the first path into the second end 24 of the first path so that such stacks can be picked up by the transfer device 32.2 and transferred onto the conveyor 7. At the same time, the unit 17 acts as a first-in first-out reservoir and collects all stacks which constitute a surplus, i.e., which reach the discharge end 14 of the conveyor 11 at a time when the frequency R1 exceeds the frequencies R2 and R3 so that the first path cannot accept all of the oncoming stacks and certain of the stacks which reach the device 32.1 must be transferred into the second path. The frequency (R3) at which the unit 16 transports stacks 2 to the second transfer device 32.2 matches the frequency (R2) at which the conveyor 7 advances stacks 2 from the station 6 into the packing machine 1.

The functions of the transporting units 16 and 17 are again interchanged when the first path becomes empty. If the first conveyor 11 continues to remain idle, the tongs 36.2 proceed to transfer stacks from the end 26 of the second path onto the receiving or intake end 28 of the conveyor 7, namely at a frequency R3 which matches the frequency (R2) of transport of stacks from the station 6 into the packing machine 1. This can be seen in FIG. 10.

When the control circuit 46 restarts the prime mover 31 for the first conveyor 11, the unit 17 acts to receive (at 23) stacks 2 from the tongs 36.1 of the transfer device 32.1 at the first station 3. At such time, the second path can still contain a certain number of stacks including the stack 2.11 shown in FIG. 11. The motor 19 is operated stepwise to advance the stacks in the second path stepwise at a frequency R3 which matches the frequency R2, and the transfer unit 32.2 cooperates with the second conveyor 7 to advance such stacks into the packing machine 1. At the same time, the unit 32.1 transfers successive stacks (note the stack 2.12 in FIG. 11) from the first station 3 onto the first end 23 of the second path at a frequency (R3) which matches the frequency R2 of advancement of stacks from the station 6 into the packing machine 1. Accordingly, the first end 23 of the second path becomes unoccupied after each stepwise movement of the upper reach of the endless flexible element of the transporting unit 17 in a direction from the end 23 toward the end 26 of the second path. If the rate of delivery of stacks 2 by the first conveyor 11 exceeds the rate of transfer of stacks from the second end 26 of the second path onto the second conveyor 7, the surplus of stacks is transferred from the station 3 into the first end 22 of the first path. In other words, the transporting unit 16 then performs the function of a first-in first-out reservoir for those stacks which cannot be transferred into the first portion 23 of the second path.

The gap 69 which remains between the last stack 2.11 of the series delivered prior to stoppage of the prime mover 31 for the first conveyor 11 and the foremost stack 25 (2.12) of the series which begins to be formed upon restarting of the prime mover 31 proceeds to advance stepwise in a direction from the first end 23 toward the second end 26 of the second path. Such advancement begins in response to a renewed interchange of functions of the transporting units 16 and 17. When the last stack 2.11 of the preceding series has been transferred by the tongs 36.2 from the second end 26 of the second path onto the receiving end 28 of the second conveyor 7, the unit 16 (which, to that instant, was operating as a reservoir and normally contains a few stacks 2 constituting a surplus) starts to perform the function of a means for transporting stacks from the first station 3 to the second station 6 and into the range of the tongs 36.2 whereas the unit 17 begins to act as a reservoir, i.e., it advances the stacks in stepwise fashion in a direction from the first end 23 toward the second end 26 of the second path. At the same time, the gap 69 moves in a direction from the end 23 toward the end 26 whenever the first end 23 receives from the tongs 36.1 a stack 2 (such as 2.12) which constitutes or forms part of a surplus. Thus, the gap 69 becomes shorter in stepwise fashion until it disappears in its entirety when the stack 2.12 reaches the second end 26 of the second path.

The preceding paragraphs describe a basically normal mode of operation of the improved apparatus, namely when the delivery of stacks 2 by the first conveyor 11 to the part 13 of the first station 3 and the advancement of stacks from the part 27 of the second station 6 toward and into the packing machine 1 take place at expected frequencies. However, the improved apparatus is preferably designed to operate satisfactorily also when one or more actual frequencies depart from the anticipated or standard frequencies.

For example, it can happen that each of the two paths defined by the transporting units 16 and 17 is filled with stacks end-to-end. Reference may be had to FIG. 9. If such situation develops prior to completion of the delivery of all stacks of a supply of stacks on a pallet onto the conveyor 11, it is necessary to provide room for the transfer of one or more additional stacks into the first end 22 of the first path or into the first end 23 of the second stack. Let it be assumed that the rate at which the packing machine 1 receives stacks 2 is less than the normal or average rate (e.g., due to a minor malfunction) or that the machine 1 has been brought to a full stop. If the device 32.1 continues to transfer stacks from the conveyor 11 onto the upper reach of the endless flexible element of the transporting unit 16 or 17 and thereupon onto the upper reach of the transporting unit 17 or 16, the two paths are bound to become filled end-to-end as shown in FIG. 9. Of course, if the packing machine 1 remains at a standstill, the feeder 9 and the first conveyor 11 must be brough to a halt.

If the packing machine 1 is thereupon restarted, the device 32.1 proceeds to deliver stacks 2 from the transporting system 4 onto the conveyor 7 so that the machine 1 accepts stacks 2 at a frequency R2. The control circuit 46 is preferably set up in such a way that, under the just outlined circumstances, the device 32.2 is caused to alternatingly transfer stacks from the second end 24 of the first path and from the second end 26 of the second path. In other words, each of the units 16, 17 acts as a reservoir during the transfer of a single stack 2 from the second end 24 or 26 to thereupon exchange functions with the other transporting unit. It goes without saying that such mode of operation is possible only if the frequency (R1) at which the conveyor 11 delivers fresh stacks 2 to the transfer device 32.1 matches the frequency (R2) at which the packing machine 1 receives stacks from the conveyor 7.

Figure 11:
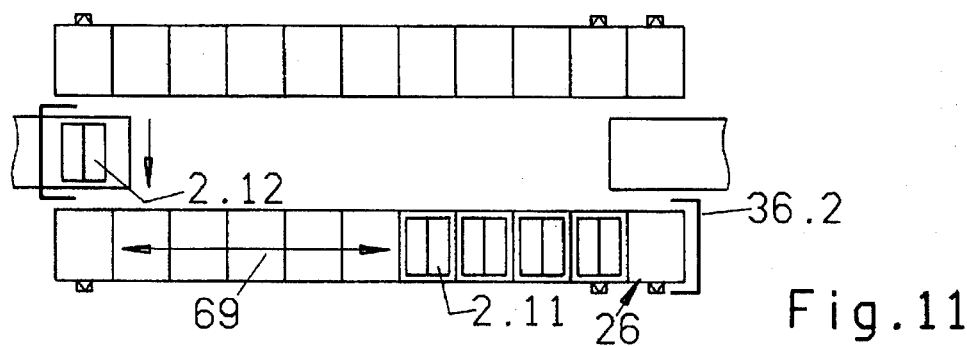

It is also possible that each of the two paths contains less than a maximum supply of surplus stacks 2 and that each such supply defines at least one gap (such as the gap 69 shown in FIG. 11). The counters 71, 72 supply the control circuit 46 with signals which enable the circuit 46 to ascertain which of the gaps is longer. The circuit 46 then proceeds to treat the unit (16 or 17) carrying the smaller supply of surplus stacks as a means for transferring stacks into the range of the transfer device 32.2 whereas the other transporting unit then constitutes a first-in first-out reservoir. Such mode of operation exhibits the advantage that the longer gaps are eliminated prior to shorter gaps. In other words, and since each gap reduces the capacity of the respective transporting unit 16 or 17 to act as a means for temporarily storing a large number of stacks, the aforedescribed mode of operation (of first eliminating the longer gap) contributes to the ability of the apparatus to store a maximum number of surplus stacks or as close to such maximum number as possible.

The improved method and apparatus exhibit a number of important advantages. Thus, the apparatus can temporarily store a substantial surplus of stacks in a small area by the novel expedient of repeatedly interchanging the functions of the two transporting units so that one of these units acts as a means for transporting stacks from the transfer device 32.1 into the range of the transfer device 32.2 whereas the other unit acts as a first-in first-out reservoir, and vice versa. It is even possible to practically completely or completely fill each of the two paths with surplus stacks without necessitating a stoppage of the conveyor 11. As described hereinbefore, this is possible if the two paths are filled with stacks and the conveyor 11 delivers to the station 3 additional stacks at a frequency matching the frequency of advancement of stacks from the station 6 into the packing machine 1. The ability of the apparatus to store a substantial supply of spare or surplus stacks 2 is desirable and advantageous because this enables the apparatus to adequately supply the machine 1 with stacks during a relatively long interval of stoppage of the conveyor 11. At such time, the packing machine 1 can be operated at its nominal speed or at a speed below the nominal speed. A prolonged stoppage of the conveyor 11 is likely to take place during removal of an empty pallet and the delivery of a loaded pallet into the range of the feeder 12.

Another important advantage of the improved apparatus is that the transporting unit 16 and/or 17 can be designed in such a way that the stacks which have been transferred into the respective path can be stored in close or immediate proximity to each other. This, too, contributes to the ability to store large numbers of surplus or spare stacks in a small area.

A further important advantage of the improved apparatus is its versatility. Thus, the apparatus can be put to use under a number of different circumstances without affecting its ability to store (if necessary) a large number of spare or surplus stacks in a small area and/or to supply stacks into the packing machine 1 at a desired frequency, either at a frequency which is required when the machine is operated at the nominal speed or a frequency which suffices when the machine is operated at less than nominal speed.

It is also within the purview of the invention to provide more than two transporting units each of which defines a discrete path for the advancement of stacks from the first transfer device 32.1 (or an analogous transfer device) into the range of the second transfer device 32.2 (or an analogous device). It has been found that, in many or most instances, the utilization of two transporting units suffices to ensure a highly satisfactory suplying of stacks to the packing machine, even a modern high-speed packing machine.

As a rule, the packing machine 1 will be provided with a magazine which receives successive stacks and from which discrete blanks are fed to the actual packing station. The exact details of the manner in which the stacks are opened up and their blanks converted into hinged-lid packets or other types of packets forms no part of the present invention.

An additional important advantage of the improved method and apparatus is that, when necessary, the temporarily stored stacks are immediately available for transfer onto the second conveyor 7 or an equivalent conveyor irrespective of whether the spare stacks are stored in the first path and/or in the second path.

As already mentioned above, the illustrated devices 32.1 and 32.2 constitute but one form of acceptable means for transferring stacks from the first station 3 into the first or into the second path and for transferring stacks from the first or second path onto the second conveyor 7. However, the illustrated devices 32.1 and 32.2 constitute presently preferred forms of transfer devices. It has been found that the vehicles 34 and the aforedescribed mode of manipulating their tongs 36 ensure simple, predictable and reliable transfer of available stacks without affecting the condition of their blanks and/or necessitating a reduction of the operating speed of the packing machine 1.

An additional important advantage of the illustrated and described transfer devices 32.1 and 32.2, as well as of the aforedescribed positioning of the first and second ends of the two paths relative to the discharge end of the first conveyor 11 and the receiving end of the second conveyor 7 is that the transfer devices are required to move the stacks through relatively short distances which also contributes to the quality and advantages of the improved apparatus.

All in all, the improved method and apparatus render it possible to ensure predictable delivery of stacks 2 to the packing machine 1 irrespective of the momentary operating speed of the packing machine and regardless of whether or not the machine is likely to change its operating speed at frequent intervals. Moreover, the conveyor 7 can deliver stacks 2 from the first or from the second path independently of short or even long or very long intervals of stoppage of the conveyor 11. Furthermore, the apparatus can be readily installed between an existing packing machine and a presently preferred source of stacks, namely a source which is capable of withdrawing stacks from a succession of pallets dimensioned to transport large numbers of stacks from a main source into the range of the first conveyor 11.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A method of supplying discrete commodities to a consuming machine, comprising the steps of delivering a series of successive commodities to a first station at a first frequency; advancing a series of successive commodities from a second station to the consuming machine at a second frequency which, is less than said first frequency during delivery of said commodities to said first station; transporting commodities from the first station to the second station along one of a plurality of elongated paths at a third frequency which at least closely approximates said second frequency so that the rate of transport of commodities along said one path is less than the rate of delivery of commodities to said first station to thus establish at the first station a surplus of commodities when the first frequency exceeds the second and third frequencies; continuously diverting the commodities which constitute the surplus from the first station; and introducing the diverted commodities into another of said plurality of elongated paths.

2. The method of claim 1, wherein the machine is operative to confine groups of rod-shaped articles of the tobacco processing industry in packets and the commodities contain sets of blanks which the machine converts into packets.

3. The method of claim 2, wherein the blanks are convertible into hinged-lid packets.

4. The method of claim 1, further comprising the step of establishing a first-in first-out reservoir for commodities which are introduced into said other of said plurality of elongated paths.

5. The method of claim 4, further comprising the step of transporting the commodities to the second station along said other path at said third frequency and introducing the commodities constituting the surplus into said one path in response to the development of predetermined circumstances pertaining to at least one of (a) delivery of commodities to the first station, (b) the advancement of commodities from the second station to the machine, and (c) the transport of commodities from the first station to the second station.

6. The method of claim 4, further comprising the steps of monitoring said second frequency, generating signals denoting the monitored second frequency, and utilizing said signals to control at least one of said transporting and introducing steps.

7. The method of claim 6, wherein said utilizing step includes transporting the commodities to the second station along said other path at said third frequency and introducing the commodities constituting the surplus into said one path when said other path is filled with commodities which constitute the surplus.

8. The method of claim 1, further comprising the steps of temporarily interrupting the delivery of commodities to the first station with attendant discontinuation of said transporting step, and transporting commodities from said other path to the second station at said second frequency in response to the interruption of delivery of commodities to the first station.

9. The method of claim 8, further comprising the steps of restarting the delivery of commodities to the first station at an increasing frequency which rises above said second frequency, continuing the introduction of commodities from the first station into said other path until the increasing frequency rises to said second frequency, and introducing into and storing in said one path that surplus of commodities which develops when the increasing frequency exceeds the second frequency.

10. The method of claim 9, further comprising the step of transporting the commodities to the second station along said other path at said third frequency until said one path is filled with commodities.

11. The method of claim 1, further comprising the steps of establishing a first-in first-out reservoir for commodities which are introduced into said other path, monitoring the numbers of commodities in said one path and in said other path and generating first and second signals respectively denoting the monitored numbers in said one path and said other path, and transporting the commodities along said other path to the second station at said third frequency when the monitored number of commodities in said other path reaches a predetermined value.

12. The method of claim 11, further comprising the steps of transporting the commodities from the first station to the second station along said other path as long as the second and third frequencies match said first frequency, and introducing the commodities constituting the surplus into said one path when the first frequency exceeds the second and third frequencies.

13. Apparatus for supplying discrete commodities to a consuming machine, comprising a first conveyor having means for delivering a series of successive commodities from a source to a first station at a first frequency; a second conveyor having means for advancing successive commodities from a second station to the consuming machine at a second frequency which, is less than said first frequency during delivery of said commodities to said first station; a plurality of transporting units defining discrete elongated paths extending between said stations, each of said units including means for transporting commodities from the first station to the second station independently of each other unit at a third frequency which at least closely approximates said second frequency; a first transfer device having means for transferring commodities from said first station into selected paths; and a second transfer device having means for transferring commodities from selected paths to the second station.

14. The apparatus of claim 13, wherein the consuming machine is a machine for packing groups of rod-shaped smokers' products into packets and the commodities are accumulations of blanks convertible into said packets.

15. The apparatus of claim 13, wherein said means for transporting commodities include endless flexible elements having at least substantially horizontal reaches for the transport of commodities between the first and second stations.

16. The apparatus of claim 13, wherein at least one of said transporting units includes a reversible prime mover for the respective transporting means.

17. The apparatus of claim 13, wherein said paths include at least substantially parallel first and second paths, said first and second paths having first ends disposed at said first station and flanking a discharge end of said first conveyor and said first and second paths further having second ends disposed at the second station and flanking a receiving end of said second conveyor.

18. The apparatus of claim 13, wherein each of said transferring means is movable at the respective station at least substantially transversely of said paths.

19. The apparatus of claim 13, wherein at least one of said devices includes a vehicle movable at the respective station in first and second directions along a track extending at least substantially transversely of said paths, said vehicle including tongs movable in third and fourth directions other than said first and second directions toward and from engagement with commodities at the respective station.

20. The apparatus of claim 13, wherein each of said paths includes first and second ends at the respective stations and further comprising means for monitoring the ends of said paths for the presence and absence of commodities.

21. The apparatus of claim 13, further comprising means for controlling the operation of said first transfer device so as to effect the transfer of commodities into selected paths in dependency upon the development of predetermined circumstances including at least one of (a) the delivery of commodities to the first station, (b) the transport of commodities between the first and second stations, and (c) the advancement of commodities from the second station.

22. The apparatus of claim 13, wherein each of said paths has first and second ends at the respective stations and at least one of said transporting means includes means for at least substantially uninterruptedly moving successive commodities of the series from the first end to the second end of the respective path, another of said transporting means including means for moving commodities stepwise from the first toward the second end of the respective path.

23. The apparatus of claim 22, wherein each of said transporting means includes means for moving commodities substantially uninterruptedly and stepwise, and further comprising means for operating one of said transporting means stepwise when another of said transporting means completes the filling of the respective path with commodities substantially end-to-end.

24. The apparatus of claim 13, wherein at least one of said transporting means is operable to constitute a first-in first-out reservoir.

* * * * *